United States Patent

Wideman et al.

[11] Patent Number: 5,679,729
[45] Date of Patent: Oct. 21, 1997

[54] SILICA REINFORCED RUBBER COMPOSITION

[75] Inventors: Lawson Gibson Wideman; Paul Harry Sandstrom, both of Tallmadge; Denise Jeannette Keith, Akron, all of Ohio

[73] Assignee: The Goodyear Tire & Rubber Company, Akron, Ohio

[21] Appl. No.: 681,031

[22] Filed: Jul. 22, 1996

Related U.S. Application Data

[63] Continuation of Ser. No. 304,294, Sep. 12, 1994, abandoned.
[51] Int. Cl.⁶ .................................................. C08K 3/36
[52] U.S. Cl. .................... 523/216; 524/289; 524/291; 524/492; 524/493; 525/439; 525/383; 525/384; 525/385; 525/244; 525/262
[58] Field of Search ........................... 525/439, 383, 525/384, 385, 244, 262; 524/493, 492, 289, 291; 523/216

[56] References Cited

U.S. PATENT DOCUMENTS 2,170,995  8/1939  Grether et al. .................... 560/17
4,310,512  1/1982  Schleppnik ........................ 560/17
5,300,577  4/1994  DiRossi et al. .................. 152/209 R
5,405,897  4/1995  Selatta et al. .................... 524/290

*Primary Examiner*—Cecilia J. Tsang
*Assistant Examiner*—Patrick R. Delaney
*Attorney, Agent, or Firm*—Bruce J. Hendricks

[57] ABSTRACT

The present invention relates to a silica reinforced rubber composition and pneumatic tires having treads comprised of the silica reinforced rubber compositions. The silica reinforced rubber composition comprises an elastomer, silica, optionally carbon black and a silica coupler of the formula:

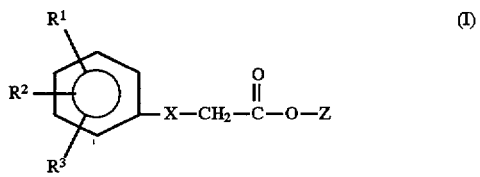

wherein $R^1$, $R^2$ and $R^3$ individually represent hydrogen or an alkyl of 1 to 6 carbon atoms; X represents oxygen or sulfur; and Z represents a hydroxyalkyl group of 2 to 7 carbon atoms.

8 Claims, No Drawings

SILICA REINFORCED RUBBER COMPOSITION

This is a continuation of application Ser. No. 08/304,294, filed on Sep. 12, 1994, now abandoned.

FIELD

This invention relates to rubber compositions which are quantitatively reinforced with silica. In one aspect, the rubber composition is comprised of rubber, particularly sulfur cured rubber, reinforced with a combination of silica and specified coupling agent and, optionally, carbon black. The silica reinforced rubber composition is particularly suited for use in a tread of a pneumatic tire.

BACKGROUND

For various applications utilizing rubber which requires high strength and abrasion resistance, particularly applications such as tires and various industrial products, sulfur cured rubber is utilized which contains substantial amounts of reinforcing fillers. Carbon black is commonly used for such purpose and normally provides or enhances good physical properties for the sulfur cured rubber. Particulate silica is also often used for such purpose, particularly when the silica is used in conjunction with a coupling agent. In some cases, a combination of silica and carbon black is utilized for reinforcing fillers for various rubber products, including treads for tires.

It is important to appreciate that, conventionally, carbon black is a considerably more effective reinforcing filler for rubber products, and particularly for rubber tire treads than silica if the silica is used without a coupling agent, or silica coupler as it may be sometimes referred to herein.

Indeed, at least as compared to carbon black, there tends to be a lack of, or at least an insufficient degree of, physical and/or chemical bonding between the silica particles and the rubber elastomers to enable the silica to become a sufficient reinforcing filler for the rubber for most purposes, including tire treads, if the silica is used without a coupler. While various treatments and procedures have been devised to overcome such deficiencies compounds capable of reacting with both the silica surface and the rubber elastomer molecule, generally known to those skilled in such art as coupling agents, are often used. Such coupling agents may, for example, be premixed, or pre-reacted, with the silica particles or added to the rubber mix during the rubber/silica processing, or mixing, stage. If the coupling agent and silica are added separately to the rubber mix during the rubber/silica mixing, or processing stage, it is considered that the coupling agent then combines in situ with the silica.

In particular, such coupling agents are generally composed of a silane which has a constituent component, or moiety, (the silane portion) capable of reacting with the silica surface and, also, a constituent component, or moiety, capable of reacting with the rubber, particularly a sulfur vulcanizable rubber which contains carbon-to-carbon double bonds, or unsaturation. In this manner, then the coupler may act as a connecting bridge between the silica and the rubber and thereby enhance the rubber reinforcement aspect of the silica.

In one aspect, the silane of the coupling agent apparently forms a bond to the silica surface, possibly through hydrolysis, and the rubber reactive component of the coupling agent combines with the rubber itself. Usually the rubber reactive component of the coupler is temperature sensitive and tends to combine with the rubber during the final and higher temperature sulfur vulcanization stage and, thus, subsequent to the rubber/silica/coupler mixing stage and, therefore, after the silane group of the coupler has combined with the silica. However, partly because of typical temperature sensitivity of the coupler, some degree of combination, or bonding, may occur between the rubber-reactive component of the coupler and the rubber during an initial rubber/silica/coupler mixing stages and, thus, prior to a subsequent vulcanization stage.

The rubber-reactive group component of the coupler may be, for example, one or more of groups such as mercapto, amino, vinyl, epoxy, and sulfur groups, preferably a sulfur or mercapto moiety and more preferably sulfur.

Numerous coupling agents are taught for use in combining silica and rubber, such as, for example, silane coupling agents containing a polysulfide component, or structure, such as bis-(3-triethoxysilylpropyl)tetrasulfide and/or polyisoprene rubber together with a mixture of silica and carbon black, with silica being required to be a major component of the silica/carbon black reinforcing filler.

Other U.S. patents relating to silicas and silica reinforced -tire treads include U.S. Pat. Nos. 3,451,458; 3,664,403; 3,768,537; 3,884,285; 3,938,574; 4,482,663; 4,590,052; 5,089,554 and British 1,424,503.

U.S. Pat. No. 4,310,512 discloses various derivatives of acetic and propionic acid as malodor counteractants. One example of such derivative is 2-hydroxyethyl phenoxyacetate.

SUMMARY OF THE INVENTION

In accordance with one aspect of the present invention, a rubber composition is disclosed which comprises (A) 100 parts by weight of at least one diene-based elastomer, (B) about 10 to about 250 phr particulate silica and (C) 0.5 to 50 phr of a silica coupler of the formula:

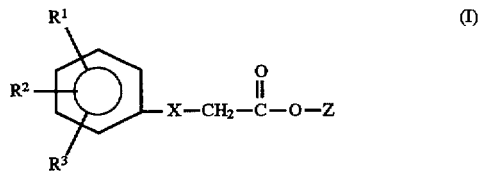

wherein $R^1$, $R^2$ and $R^3$ individually represent hydrogen or an alkyl of 1 to 6 carbon atoms; X represents oxygen or sulfur; and Z represents a hydroxyalkyl group of 2 to 7 carbon atoms; wherein the weight ratio of said silica coupler to silica is in a range of about 1:100 to about 1:5.

DETAILED DESCRIPTION OF THE INVENTION

In accordance with another aspect of the present invention, there is disclosed a pneumatic tire having a tread comprised of (A) 100 parts by weight of at least one diene-based elastomer, (B) about 10 to about 250 phr particulate silica and (C) from 0.5 to 50 phr of a silica coupler of the formula:

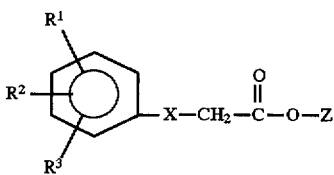

wherein $R^1$, $R^2$ and $R^3$ individually represent hydrogen or an alkyl of 1 to 6 carbon atoms; X represents oxygen or sulfur; and Z represents a hydroxyalkyl group of 2 to 7 carbon atoms; wherein the weight ratio of said silica coupler to silica is in a range of about 1:100 to about 1:5.

There is also disclosed a process for improving the reinforcing properties of a rubber polymer containing a siliceous filler comprising adding from 0.5 to 50 phr of a silica coupler of formula I.

The silica coupling agents are prepared in a known manner by reacting, where X represents oxygen or sulfur, the appropriate aryloxy- or arylthio-acetic acid having the formula:

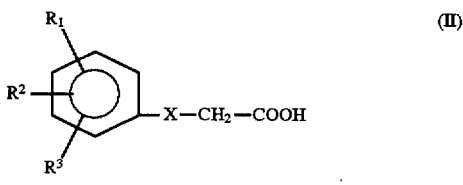

wherein $R^1$, $R^2$, $R^3$ and X have been defined above in formula I with an appropriate polyol, preferably a glycol, or its corresponding alkylene oxide.

Reaction of the appropriate aryloxy- or arylmercapto-acid with the appropriate polyol is conducted in an inert diluent, e.g. benzene, toluene, cyclohexane or xylene, in the presence of an acid catalyst such as hydrochloric acid, a strong acid ion-exchange resin or toluene sulfonic acid at elevated temperatures, preferably at the reflux temperature of the mixture. The product is obtained by crystallization or distillation.

Reaction of the appropriate aryloxy- or arylthio- acid and an alkylene oxide is conducted in water in the presence of a base such as sodium hydroxide or potassium hydroxide at a temperature of from about 0°–50° C. Following extraction into an organic solvent, washing to remove unreacted organic acid, drying and removal of the solvent the product is obtained by crystallization or distillation.

Exemplary compounds which may be used to prepare the silica Coupling agents include phenoxyacetic acid, p-isopropylphenoxyacetic acid, o-methylphenoxyacetic acid, p-tert-butylphenoxyacetic acid, 3,4-dimethylphenoxyacetic acid and phenylthioacetic acid.

Exemplary polyols which are utilized to prepare the silica coupling agents include ethylene glycol, butylene glycol, 1,2-propanediol, 1,3-propanediol, 1,3-butanediol, 1,4-butanediol and 1,6-hexanediol.

An exemplary alkylene oxide is ethylene oxide.

The term "phr" as used herein, and according to conventional practice, refers to "parts by weight of a respective material per 100 parts by weight of rubber, or elastomer".

The amount of silica coupler of formula I in a rubber composition will vary depending on the level of silica that is used. Generally speaking, the amount of the silica coupler of formula I will range from 0.5 to 50. Preferably, the amount will range from 1.5 to 8 phr. Depending on the desired properties, the weight ratio of the silica coupler of formula I to silica may vary. Generally speaking, the weight ratio will range from 1:100 to 1:5. Preferably, the weight ratio will range from 1:20 to 1:10.

In the description of this invention, the terms "rubber" and "elastomer" may be used interchangeably, unless otherwise prescribed. The terms "rubber composition", "compounded rubber" and "rubber compound" are used interchangeably to refer to rubber which has been blended or mixed with various ingredients and materials and such terms are well known to those having skill in the rubber mixing or rubber compounding art.

At least one rubber which is used as the silica reinforced rubber composition of the present invention is a diene-based elastomer, or rubber. Thus, it is considered that the elastomer is a sulfur curable elastomer. Such elastomer, or rubber, may be selected, for example, from at least one of cis 1,4-polyisoprene rubber (natural and/or synthetic, and preferably natural rubber), 3,4-polyisoprene rubber, styrene/butadiene copolymer rubbers, styrene/isoprene/butadiene terpolymer rubbers, cis 1,4-polybutadiene rubber and butadiene/acrylonitrile copolymer rubber.

In one aspect the rubber is preferably of at least two of diene based rubbers. For example a combination of two or more rubbers is preferred such as cis 1,4-polyisoprene rubber (natural or synthetic, although natural is preferred), 3,4-polyisoprene rubber, styrene/isoprene/butadiene rubber, emulsion and solution polymerization derived styrene/butadiene rubbers, cis 1,4-polybutadiene rubbers and emulsion polymerization prepared butadiene/acrylonitrile copolymers.

In one aspect of this invention, an emulsion polymerization derived styrene/butadiene (E-SBR) might be used having a relatively conventional styrene content of about 20 to about 28 percent bound styrene or, for some applications, an E-SBR having a medium to relatively high bound styrene content, namely a bound styrene content of about 30 to about 45 percent.

The relatively high styrene content of about 30 to about 45 for the E-SBR can be considered beneficial for a purpose of enhancing traction, or skid resistance, of the tire tread. The presence of the E-SBR itself is considered beneficial for a purpose of enhancing processability of the uncured elastomer composition mixture, especially in comparison to a utilization of a solution polymerization prepared SBR (S-SBR).

By emulsion polymerization prepared E-SBR, it is meant that styrene and 1,3-butadiene are copolymerized as an aqueous emulsion. Such are well known to those skilled in such art. The bound styrene content can vary, for example, from about 5 to 50%. In one aspect, the E-SBR may also contain acrylonitrile to form a terpolymer rubber, as E-SBAR, in amounts, for example, of about 2 to about. 30 weight percent bound acrylonitrile in the terpolymer.

Emulsion polymerization prepared styrene/butadiene/acrylonitrile copolymer rubbers containing about 2 to about 40 weight percent bound acrylonitrile in the copolymer are also contemplated as diene based rubbers for use in this invention.

The solution polymerization prepared SBR (S-SBR) typically has a bound styrene content in a range of about 5 to about 50, preferably about 9 to about 36, percent. The S-SBR can be conveniently prepared, for example, by organo lithium catalyzation in the presence of an organic hydrocarbon solvent.

A purpose of using S-SBR is for improved tire rolling resistance as a result of lower hysteresis when it is used in a tire tread composition.

The 3,4-polyisoprene rubber (3,4-PI) is considered beneficial for a purpose of enhancing the tire's traction when it is used in a tire tread composition.

The 3,4-PI and use thereof is more fully described in U.S. Pat. No. 5,087,668 which is incorporated herein by reference. The Tg refers to the glass transition temperature which can conveniently be determined by a differential scanning calorimeter at a heating rate of 10° C. per minute.

The cis 1,4-polybutadiene rubber (BR) is considered to be beneficial for a purpose of enhancing the tire tread's wear, or treadwear. Such BR can be prepared, for example, by organic solution polymerization of 1,3-butadiene. The BR may be conveniently characterized, for example, by having at least a 90% cis 1,4-content.

The cis 1,4-polyisoprene and cis 1,4-polyisoprene natural rubber are well known to those having skill in the rubber art.

The vulcanized rubber composition should contain a sufficient amount of silica, and carbon black, if used, to contribute a reasonably high modulus and high resistance to tear. The silica filler may be added in amounts ranging from 10 to 250 phr. Preferably, the silica is present in an amount ranging from 15 to 80 phr. If carbon black is also present, the amount of carbon black, if used, may vary. Generally speaking, the amount of carbon black will vary from 0 to 80 phr. Preferably, the amount of carbon black will range from 0 to 40 phr.

Where the rubber composition contains both silica and carbon black, the weight ratio of silica to carbon black may vary. For example, the weight ratio may be as low as 1:5 to a silica to carbon black weight ratio of 30:1. Preferably, the weight-ratio of silica to carbon black ranges from 1:3 to 5:1. The combined weight of the silica and carbon black, as hereinbefore referenced, may be as low as about 30 phr, but is preferably from about 45 to about 90 phr.

The commonly employed siliceous pigments used in rubber compounding applications can be used as the silica in this invention, including pyrogenic and precipitated siliceous pigments (silica), although precipitate silicas are preferred. The siliceous pigments preferably employed in this invention are precipitated silicas such as, for example, those obtained by the acidification of a soluble silicate, e.g., sodium silicate.

Such silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, page 304 (1930).

The silica may also be typically characterized by having a dibutylphthalate (DBP) absorption value in a range of about 100 to about 400, and more usually about 150 to about 300.

The silica might be expected to have an average ultimate particle size, for example, in the range of 0.01 to 0.05 micron as determined by the electron microscope, although the silica particles may be even smaller, or possibly larger, in size.

Various commercially available silicas may be considered for use in this invention such as, only for example herein, and without limitation, silicas commercially available from PPG Industries under the Hi-Sil trademark with designations 210, 243, etc.; silicas available from Rhone-Poulenc, with, for example, designations of Z1165MP and Z165GR and silicas available from Degussa AG with, for example, designations VN2 and VN3, etc. The PPG Hi-Sil silicas are currently preferred.

It is readily understood by those having skill in the art that the rubber composition would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, such as oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts. Typical amounts of reinforcing type carbon blacks(s), for this invention, if used, are hereinbefore set forth. It is to be appreciated that the silica coupler may be used in conjunction with a carbon black, namely pre-mixed with a carbon black prior to addition to the rubber composition, and such carbon black is to be included in the aforesaid amount of carbon black for the rubber composition formulation. Typical amounts of tackifier resins, if used, comprise about 0.5. to about 10 phr, usually about 1 to about 5 phr. Typical amounts of processing aids comprise about 1 to about 50 phr. Such processing aids can include, for example, aromatic, napthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), pages 344–346. Typical amounts of antiozonants comprise about 1 to 5 phr. Typical amounts of fatty acids, if used, which can include stearic acid comprise about 0.5 to about 3 phr. Typical amounts of zinc oxide comprise about 2 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

In one aspect of the present invention, the silica reinforced rubber composition is sulfur cured or vulcanized.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from 2 to 2.5, being preferred.

Vulcanization of the rubber composition of the present invention is generally carried out at conventional temperatures ranging from about 100° C. to 200° C. Preferably, the vulcanization is conducted at temperatures ranging from about 110° C. to 180° C. Any of the usual vulcanization processes may be used such as heating in a press or mold, heating with superheated steam or hot air or in a salt bath.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 1.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention which is more primarily directed to the use of silica as a reinforcing filler in combination with the hydroxyalkylester of phenoxyacetic acid or of phenylthioacetic acid as a coupling agent.

The silica reinforced rubber compositions of the present invention may contain a methylene donor. The term "methylene donor." is intended to mean a compound capable of reacting with the silica coupler of formula I and generate the resin in-situ. Examples of methylene donors which are suitable for use in the present invention include hexamethylenetetramine, hexaethoxymethylmelamine, hexamethoxymethylmelamine, lauryloxymethylpyridinium chloride, ethoxymethylpyridinium chloride, trioxan hexamethoxymethylmelamine, the hydroxy groups of which may be esterified or partly esterified, and polymers of formaldehyde such as paraformaldehyde. In addition, the methylene donors may be N-substituted oxymethylmelamines, of the general formula:

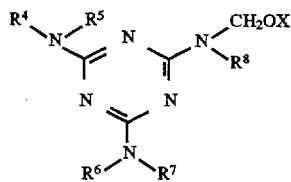

wherein X is an alkyl having from 1 to 8 carbon atoms, $R^4$, $R^5$, $R^6$, $R^7$ and $R^8$ are individually selected from the group consisting of hydrogen, an alkyl having from 1 to 8 carbon atoms and the group —$CH_2OX$. Specific methylene donors include hexakis(methoxymethyl)melamine, N,N',N"-trimethyl/N,N',N"-trimethylolmelamine, hexamethylolmelamine, N,N',N"-dimethylolmelamine, N-methylolmelamine, N,N'-dimethylolmelamine, N,N',N"-tris(methoxymethyl)melamine and N, N',N"-tributyl-N,N', N"-trimethylol-melamine. The N-methylol derivatives of melamine are prepared by known methods.

The amount of methylene donor that is present in the rubber stock may vary. Typically, the amount of methylene donor that is present will range from about 0.1 phr to 10.0 phr. Preferably, the amount of methylene donor ranges from about 2.0 phr to 5.0 phr.

The weight ratio of methylene donor to the silica coupler of formula I may vary. Generally speaking, the weight ratio will range from about 1:10 to about 10:1. Preferably, the weight ratio ranges from about 1:3 to 3:1.

The presence and relative amounts of the above-conventional additives are not considered to be an aspect of the present invention which is more primarily directed to the utilization of specified blends of rubbers in rubber compositions, in combination with silica and the silica coupler of formula I, as well as, optionally, carbon black, for the reinforcement of the rubber.

The mixing of the rubber composition can be accomplished by methods known to those having skill in the rubber mixing art. For example the ingredients are typically mixed in at least two stages, namely at least one non-productive stage followed by a productive mix stage. The final curatives are typically mixed in the final stage which is conventionally called the "productive" mix stage in which the mixing typically occurs at a temperature, or ultimate temperature, lower than the mix temperature(s) than the preceding non-productive mix stage(s). The rubber, silica and silica coupler, and carbon black if used, are mixed in one or more non-productive mix stages. The terms "non-productive" and "productive" mix stages are well known to those having skill in the rubber mixing art.

The rubber composition of this invention can be used for various purposes. For example, it can be used for various tire compounds. Such tires can be built, shaped, molded and cured by various methods which are known and will be readily apparent to those having skill in such art. Preferably, the rubber composition is used in the tread of a tire. As can be appreciated, the tire may be a passenger tire, aircraft tire, truck tire and the like. Preferably, the tire is a passenger tire. The tire may also be a radial or bias, with a radial tire being preferred.

The invention may be better understood by reference to the following examples in which the parts and percentages are by weight unless otherwise indicated.

The following examples are presented in order to illustrate but not limit the present invention.

Cure properties were determined using a Monsanto oscillating disc rheometer which was operated at a temperature of 150° C. and at a frequency of 11 hertz. A description of oscillating disc rheometers can be found in the Vanderbilt Rubber Handbook edited by Robert O. Ohm (Norwalk, Conn., R. T. Vanderbilt Company, Inc., 1990), pages 554–557. The use of this cure meter and standardized values read from the curve are specified in ASTM D-2084. A typical cure curve obtained on an oscillating disc rheometer is shown on page 555 of the 1990 edition of the Vanderbilt Rubber Handbook.

In such an oscillating disc rheometer, compounded rubber samples are subjected to an oscillating shearing action of constant amplitude. The torque of the oscillating disc embedded in the stock that is being tested that is required to oscillate the rotor at the vulcanization temperature is measured. The values obtained using this cure test are very significant since changes in the rubber or the compounding recipe are very readily detected. It is obvious that it is normally advantageous to have a fast cure rate.

The following tables report cure properties that were determined from cure curves that were obtained from the rubber stocks that were prepared. These properties include a torque minimum (Min. Torque), a torque maximum (Max. Torque), minutes to 90% of the torque increase (t90) and difference between the maximum torque and minimum torque (delta torque).

Shore Hardness was determined in accordance with ASTM D-1415.

EXAMPLE 1

Preparation of 2-Hydroxyethyl Phenoxyacetate

A 2-liter, 3-neck, round-bottom flask was equipped with a heating jacket, thermocouple and Dean-Stark apparatus for water removal. The flask was charged with 152 g (1.0 mole) phenoxyacetic acid, 62 g (1.0 mole) ethylene glycol, 22 g p-toluenesulfonic acid, 260 ml mixed xylenes and swept with nitrogen and sealed under a nitrogen balloon. The flask contents were heated to a pot temperature of 150° C. for ½ hour wherein 23 ml of water were collected and the reaction system cooled. Volatiles were removed at 110° C. in 4 mm of Hg vacuum to give a waxy white solid. IR shows formation of ester and disappearance of acid carbonyl, and mass spectrometry shows the molecular weight of 196.

EXAMPLE 2

In this example, 2-hydroxyethyl phenoxyacetate (prepared in Example 1) was evaluated as an alternative for a commonly used silica, coupling agent, bis-(3-triethoxysilylpropyl) tetrasulfide, in a silica reinforced rubber composition. Rubber compositions containing the materials set out in Tables 1 and 2 were prepared in a BR Banbury mixer using three separate stages of addition (mixing), namely, two non-productive mix stages and one productive mix stage to temperatures of 160° C., 160° C. and 120° C. and times of 4 minutes, 4 minutes and 2 minutes, respectively. The amount of coupler is listed as being "variable" in Table 1 and is more specifically set forth in Table 2.

The rubber compositions are identified herein as Samples 1, 2 and 3, with Samples 2 and 3 utilizing the silica couplers, respectively, and Sample 1 considered herein as being a control without the use of a silica coupler.

The Samples were cured at about 150° C. for about 36 minutes.

Table 2 illustrates the behavior and physical properties of the cured Samples 1–3.

It is clearly evident from the results that a coupling agent is required (Samples 2 and 3) to obtain suitable cured properties in a silica containing rubber compound. Such properties include tensile strength at break, the 300%/100% modulus ratio, rebound, hardness and Rheovibron E' and tan delta values.

The 2-hydroxyethyl phenoxyacetate used as a silica coupler (Sample 3) is observed to provide substantial equivalence in these properties as a conventional bis-(3-triethoxysilylpropyl)tetrasulfide silica coupling agent (Sample 2).

This is considered an advantage because it is shown that rubber properties equivalent to the silane coupler might be achieved with a potential lower cost. Thus, the 2-hydroxyethyl phenoxyacetate is considered herein to be a suitable alternative for bis-(3-triethoxysilylpropyl) tetrasulfide as a silica coupling agent in a silica reinforced rubber composition. 2-Hydroxyethyl phenoxyacetate may be exposed to the atmosphere and adventitious moisture for a much longer period of time due to its much greater shelf-life and hydrolytic stability over Si69 which will lose activity on sitting.

When compared with Sample 2, the 2-hydroxyethyl phenoxyacetate shows higher E' and lower Tan delta at 60° C. and less reversion.

TABLE 1

| 1st Non-Productive | |
|---|---|
| Synthetic cis 1,4-Polyisoprene[1] | 100.00 |
| Carbon Black | 35.00 |
| Processing Oil | 5.00 |
| Zinc Oxide | 5.00 |
| Fatty Acid | 2.00 |
| Antioxidant[2] | 2.00 |

TABLE 1-continued

| 2nd Non-Productive | |
|---|---|
| Silica[3] | 15.00 |
| Bis-(3-triethoxysilylpropyl) tetrasulfide[4] | variable |
| 2-Hydroxyethyl Phenoxyacetate | variable |
| Productive | |
| Sulfur | 1.40 |
| Accelerator, sulfenamide type | 1.00 |

[1] commercially available from The Goodyear Tire & Rubber Company under the designation Natsyn ® 2200;
[2] of the polymerized 1,2-dihydro-2,2,4-trimethyldihydroquinoline type;
[3] Silica obtained as Hi-Sil-210 from PPG Industries, Inc.;
[4] obtained as bis-(3-triethoxysilylpropyl)tetrasulfide, commercially available as Si69 from Degussa GmbH which is provided in a 50/50 blend with carbon black and, thus, considered as being 50% active when the blend is considered.

TABLE 2

| Sample # | 1 | 2 | 3 |
|---|---|---|---|
| Bis-(3-triethoxysilylpropyl) tetrasulfide (50% active) | 0 | 3.0 | 0 |
| 2-hydroxyethyl Phenoxyacetate | 0 | 0 | 2.0 |
| Rheometer (150° C.) | | | |
| Delta Torque | 22.0 | 28.4 | 26.9 |
| T$_{90}$, minutes | 21.8 | 18.8 | 19.5 |
| Stress-Strain | | | |
| Tensile Strength, MPa | 16.1 | 19.1 | 19.8 |
| Elongation at Break, % | 648 | 579 | 610 |
| 300%/100% Modulus Ratio | 4.42 | 4.75 | 4.65 |
| Rebound | | | |
| 100° C., % | 56.4 | 60.2 | 60.5 |
| Room Temperature | 46.0 | 47.3 | 43.7 |
| Hardness | | | |
| 100° C. | 42.9 | 52.8 | 50.3 |
| Room Temperature | 45.9 | 56.5 | 57.2 |
| Rheovibron | | | |
| E' at 60° C., MPa | 7.7 | 10.9 | 12.9 |
| Tan Delta at 60° C. | 0.126 | 0.102 | 0.095 |
| Reversion | | | |
| 60' (pt drop on Rheometer) | 3.0 | 1.3 | 0.7 |

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic tire having a tread comprised of (A) 100 parts by weight of at least one diene-based elastomer, (B) about 10 to about 250 phr particulate silica and (C) from 0.5 to 50 phr of a silica coupler of the formula:

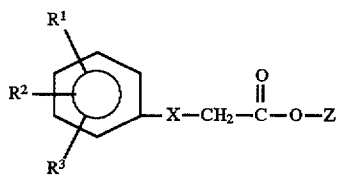

(II)

wherein $R^1$, $R^2$ and $R^3$ individually represent hydrogen or an alkyl of 1 to 6 carbon atoms; X represents oxygen or sulfur; and Z represents a hydroxyalkyl group of 2 to 7 carbon atoms.

2. The pneumatic tire of claim 1 wherein $R^1$, $R^2$ and $R^3$ are each hydrogen.

3. The pneumatic tire of claim 1 wherein Z is a hydroxyalkyl group of two to four carbon atoms.

4. The pneumatic tire of claim 1 wherein $R^1$, $R^2$ and $R^3$ are each hydrogen and Z is a hydroxyalkyl group of two carbon atoms.

5. The pneumatic tire of claim 1 wherein said silica coupler is present in an amount ranging of from 1.5 to 8 phr.

6. The pneumatic tire of claim 1 wherein the diene based elastomer is selected from at least one of cis 1,4-polyisoprene rubber, 3,4-polyisoprene rubber, styrene/butadiene copolymer rubbers, styrene/isoprene/butadiene terpolymer rubbers, cis 1,4-polybutadiene rubber, and emulsion polymerization prepared styrene/butadiene/acrylonitrile terpolymer rubber and butadiene/acrylonitrile copolymer rubber.

7. The pneumatic tire of claim 1 wherein the silica is characterized by having a BET surface area in a range of about 40 to about 600 square meters per gram and a dibutylphthalate (DBP) absorption value in a range of about 100 to about 400.

8. The pneumatic tire of claim 1 wherein X is sulfur.

* * * * *